Patented Dec. 25, 1923.

1,478,987

UNITED STATES PATENT OFFICE.

JACQUE C. MORRELL, OF CHICAGO, ILLINOIS.

PRODUCTION OF ADSORBENT CHARCOAL.

No Drawing. Application filed February 3, 1922. Serial No. 533,975.

*To all whom it may concern:*

Be it known that I, JACQUE C. MORRELL, a citizen of the United States, residing at Chicago, in the county of Cook and State of Illinois, have invented certain new and useful Improvements in the Production of Adsorbent Charcoal, of which the following is a specification.

This invention relates to artificial or synthetic charcoals.

These charcoals may be employed for the removal of impurities from air for respiration, or for the concentration and recovery for further use of valuable gases or vapors in a great many industrial processes. This charcoal may also be used in various industrial and laboratory processes as a decolorizing and purifying agent for the removal of color and impurities from liquids and solutions, for example, in the refining of oils of a vegetable, mineral or animal character, and decolorizing and refining of sugar, glycerine and other organic substances. Also, as an adsorbent for gases and vapors and decolorizer of various substances and as a deodorant and purifier of all types of liquids and solutions, its use is practically unlimited. It may be applied wherever adsorptive, decolorizing or purifying material can be used in the liquid or gas phase.

Some of its important industrial uses are:

The recovery of gasoline vapor from natural gases and still gases. The recovery and purification of vaporized solvents in air or gas mixtures.

The refining and decolorization of petroleum and coal tar distillates and their derivatives.

The refining and decolorizing of animal and vegetable oils.

For air conditioning and humidity control.

As a catalyst—

For decolorizing and purifying of sugar solutions, glycerine and aqueous or non-aqueous solutions of organic compounds.

Purification of water and air.

As a deodorant—

As in my co-pending application, Serial No. 284,459, a process is provided whereby some form of carbon, preferably of a non-graphitoidal variety such as carbon black, lamp black and various vegetable and animal carbons, is molded after incorporation with a binding material which chars on heating, such binding material including many organic bodies.

This molded mixture is then compressed or briquetted, comminuted to suitable size after which it is heated to decompose the binding material and then activated by heat treatment alone or by heating in the presence of steam or some other mild oxidizing agent.

Owing to the very viscous nature of material suitable for use as a binding material in making adsorbent charcoal, and owing to the relatively large amount of binder necessary to incorporate with the carbon material, the problem of distribution of the binder becomes a very important one. This is especially so because uniformity of distribution of the binder has a marked effect on the porosity and uniformity of the synthetic charcoal and consequently upon its activity.

In my co-pending application above referred to I have described one method of accomplishing this distribution of the binder by dispersing the binding material in the form of an emulsion or suspension in a very fluid medium such as water containing a protective colloid.

Still another method is described in a later application Serial No. 314,501, filed July 31, 1919, by which the binding material is distributed in a fluid medium.

In general, my new process consists in mixing a non-fluid or solid binding material which melts or softens at a sufficiently low temperature and which chars on heating, with a carbon material, such as is described above, and then heating the mixture above the melting or softening point of the binder, molding the heated mixture, comminuting, charring by heat treatment and activating. I may also carry out my process by mixing a non-fluid or solid binding material which chars on heating, with a carbon material, wetting the mixture with a liquid which will dissolve, disperse or flux with the binding material and then molding the mixture or I may first remove the excess liquid by evaporation or distillation and then mold the resulting material which is then comminuted and subjected to heat treatment and activation.

In some cases it is advantageous to use concentrated solutions of the binding material to be mixed with the carbon material. The moistening liquid may be water, oil or some other organic liquid depending upon the nature of the binding material.

By the term carbon is meant pure carbon or a mixture of natural or artificial origin which contains a high percentage of carbon. This includes the various charcoals and carbons of animal, vegetable or mineral origin.

The binding material may be of one or two types; namely, practically soluble, or dispersible in water, or practically insoluble or non-dispersible in water.

In general it must be a substance which chars on heating; i. e., of an organic nature.

As examples of water-soluble or dispersible binders may be mentioned the following classes of substances:

Sugars, starches, and carbohydrates in general.

Pectins comprising the various gels.

Proteins including glues, gelatins, albumins, casein, gums, tannins, etc.

Various mixtures of natural or artificial origin such as hydrolyzed wood waste, sulphite liquor pitch and other substances which char on heating.

Among the water-insoluble binders, which as a rule are soluble in oil or some other organic liquid, may be mentioned a few classes:

Pitches of every class and from any source in general resulting from the destructive distillation of organic substances. Pitches containing a high per cent of saturated hydrocarbons are not as desirable as those of other types. Solid bitumens and asphalts, resins, asphaltites, gum resins, resinified oils and other substances which char on heating.

A specific example of the process is as follows:

The binding material, preferably a coal tar pitch, is first comminuted by grinding or otherwise. It is then thoroughly mixed with the carbon material, which is preferably of the dull, soft black or non-graphitoidal variety. Preferably the amount of carbon used is from 1 to 4 times the total actual binding material. As an example of binding material insoluble or non-dispersible in water, coal tar and resin pitch may be mentioned as having given the best results of readily obtainable materials.

Among water-soluble or dispersible binders giving excellent results may be mentioned glucose and waste sulphite liquor pitch.

If the method employing a moistening agent is used, the mixture is then moistened with the proper liquid, namely and preferably, creosote or anthracene oil or other coal tar distillate for coal tar pitch, which is preferably used, or some liquid wood distillate or resin distillate for resin pitch if that is used; e. g. wood tar distillate. Enough of the solvent is added to the pitch and carbon mixture to allow the mixture to be properly molded, the excess liquid being removed by gentle heat as explained below. For the glucose or waste liquor sulphite pitch, water of course is used. In either case, the moistened mixture may then be gently heated to remove by evaporation or distillation the excess solvent and then molded or compressed; or it may be molded or compressed directly if the amount of moistening liquid present is not too great. Preferably, the former method is used. To accomplish the compression, this product is placed in a mold consisting of a sleeve, plunger and plug which is heated to about 90° C. and compressed with a pressure of 32,000–60,000 lbs. per square inch. Any substantial pressure, however, will suffice. The quality of the product improves with increase in pressure up to a certain point. The function of molding under pressure is a very important one, determining to a large extent the nature and quality of the finished product. The best types of charcoal possess a large degree of porosity and have supporting walls which are most dense. These are the qualities which molding under pressure gives the finished product. Also, the pores and ducts of the carbon should be of the continuous or spongy type. If the residue is heated without first molding under pressure a large proportion of the ducts are discontinuous and the product is friable because the walls are not sufficiently dense. In large scale work a rotary press, whose molds pass through a heated zone, may also be used. The molded material is then comminuted, heated to decompose the binder and then activated either by repeated heating or in the presence of steam or other suitable mild oxidizing agent.

The temperature at which it is necessary to heat the molded material, whether comminuted or not, in order to char the binding material is dependent upon the melting point of the binder and also upon the quantity of other materials besides carbon employed with the binder. The material is introduced into a furnace and gradually brought to the decomposing temperature. Schedules of four hours at approximately 850° C., then to about 925° C., for about ½ hour and of about three hours at 925–950° C., have proven satisfactory.

I have found that a final heat treatment following the above steps causes a marked improvement in the efficiency of the charcoal. This is true not only of synthetic charcoal but also of other charcoals, for example, standard cocoanut charcoal which showed an improvement of 50% in activity after this treatment. The apparent density of the charcoal after this treatment shows a pronounced lowering which, it is thought, is caused by the internal oxidation of adsorbed air or the removal of hydrocarbons, or both of these treatments. Heating beyond a certain length of time in the first carbonization treatment causes little improvement in the charcoal; however, if the charcoal is allowed to cool to about 250° C., removed from the furnace and cooled in the air to room temperature, and is then again raised to the high temperature in another furnace, improved results are accomplished. This is due to the fact that the walls of the furnace wherein the original charring and activation takes place contain condensed hydrocarbons and a second treatment in such a furnace would again cause the activation to take place in an atmosphere of these hydrocarbons which conditions are avoided by having the later heating in a different furnace. This second heat treating process may be carried on for about two hours at about 850–950° C. In some instances a similar third heat treatment may give beneficial results. Heating in the presence of steam or other mild oxidizing agents often produces beneficial results. This may be accomplished by any well known method, for example, by introducing steam or carbon dioxide directly into the retort.

Activation of charcoal or carbon is the increasing of the adsorption efficiency of the material. This may be accomplished among other methods by:
(a) Repeated heat treatments.
(b) Steam treatment.
(c) Heating in presence of mild oxidizing agents.

The process of activation is probably:
(a) An opening up of the closed pores into ducts (continuous pores) by fracturing the walls.
(b) Removal of tenacious hydrocarbons and substances other than carbon by decomposition, cracking and volatilization.
(c) Changing hard graphitoidal or "coke like" carbon to the soft, dull, velvety or non-graphitoidal variety.
(d) Removal of secondary carbon obstructions from the ducts.
(e) Forming or creating new ducts in the carbon and thus increasing adsorption surface.

In some cases, as mentioned previously, it may be advantageous to mix the carbon material directly with a liquid binder either as such or as a solution of the non-fluid binder if the latter solution is sufficiently fluid and the excess liquid may be removed before molding, by pressure, filtration, evaporation or a combination of two or more of these. It is to be understood that the binder in the above solution must char on heating. The liquid binder must be such that on heating it finally yields carbon residue.

A further useful application of the principles involved in the production of adsorbed charcoal as embodied in my invention is as follows: In some industries where decomposition of organic substances takes place under varying conditions of temperature and pressure, there are produced large amounts of carbon as well as pitchy materials. Where the carbon product is of the right type, that is, non-graphitoidal in nature, the pitch present enables the carbon to be molded or compressed directly without further addition of binder and then made into synthetic charcoal by following the steps herein described; namely, comminuting the molded material and then charring and activating. If there is an excess of pitch present, additional carbon may be added, and vice versa. If there is insufficient pitch present, additional binding material may be added.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

This application is a continuation in part of my applications Serial No. 284,459, filed March 22, 1919, and Serial No. 314,501, filed July 31, 1919.

I claim as my invention:
1. In a process of making built-up structural adsorbent charcoal, heating a mixture of carbon with a non-fluid binder which chars on heating to the softening point of the binder, molding the mixture under substantial pressure, charring the binding material therein and activating by heating.
2. In a process of making built-up structural adsorbent charcoal, molding under substantial pressure a mixture of carbon with a non-fluid binder which chars on heating while being heated to the softening point of the binder, charring the binding material and activating the resulting product by heating.
3. In a process of making built-up structural adsorbent charcoal, moistening or wetting a mixture of carbon and a non-fluid binder which chars on heating with a liquid which will dissolve, disperse or flux with the binder, molding the mixture under substantial pressure, charring the binding material therein and activating by heating.
4. In a process of making built-up structural adsorbent charcoal, moistening or wetting a mixture of carbon and a non-fluid binder which chars on heating with a liquid which will dissolve, disperse or flux with the binder, removing the excess liquid, molding the mixture under substantial pressure, charring the binding material therein and then activating by heating.

5. In a process of making built-up structural adsorbent charcoal, heating a mixture of carbon and a liquid containing a binder which chars on heating, molding the mixture under substantial pressure, charring the binding material therein and activating by heating.

6. In a process of making built-up structural adsorbent charcoal, heating a mixture of carbon with a non-fluid binder which chars on heating to the softening point of the binder, molding the mixture under substantial pressure, charring the binding material therein and activating by heating and treatment with a mild oxidizing agent.

7. In a process of making built-up structural adsorbent charcoal, molding under substantial pressure a mixture of carbon with a non-fluid binder which chars on heating while being heated to the softening point of the binder, charring the binding material and activating the resulting product by heating and steaming.

8. In a process of making built-up structural adsorbent charcoal, moistening or wetting a mixture of carbon and a non-fluid binder which chars on heating with a liquid which will dissolve, disperse or flux with the binder, molding the mixture under substantial pressure, charring the binding material therein and activating by heating and treatment with a mild oxidizing agent.

9. In a process of making built-up structural adsorbent charcoal, moistening or wetting a mixture of carbon and a non-fluid binder which chars on heating with a liquid which will dissolve, disperse or flux with the binder, removing the excess liquid, molding the mixture under substantial pressure, charring the binding material therein and then activating by heating and steaming.

10. In a process of making built-up structural adsorbent charcoal, heating a mixture of carbon with a non-fluid binder which chars on heating to the softening point of the binder, molding the mixture under substantial pressure, comminuting the molded material and charring the binding material therein and activating by heating.

11. In a process of making built-up structural adsorbent charcoal, moistening or wetting a mixture of carbon and a non-fluid binder which chars on heating with a liquid which will dissolve, disperse or flux with the binder, molding the mixture under substantial pressure, comminuting the molded material and charring the binding material therein, and activating by heating.

12. In a process of making built-up structural adsorbent charcoal, heating a mixture of carbon with a non-fluid binder which chars on heating to the softening point of the binder, molding the mixture under substantial pressure, charring the binding material therein, activating by heating, cooling and then reheating.

13. In a process of making built-up structural adsorbent charcoal, moistening or wetting a mixture of carbon and a non-fluid binder which chars on heating with a liquid which will dissolve, disperse or flux with the binder, molding the the mixture under substantial pressure, charring the binding material therein, activating by heating, cooling and then reheating.

14. In a process of making built-up structural adsorbent charcoal, heating a mixture of carbon with a non-fluid binder which chars on heating to the softening point of the binder, molding the mixture under substantial pressure, comminuting the molded material and charring the binding material therein, activating by heating, cooling, and then reheating.

15. In a process of making built-up structural adsorbent charcoal, moistening or wetting a mixture of carbon and a non-fluid binder which chars on heating with a liquid which will dissolve, disperse or flux with the binder, molding the mixture under substantial pressure, comminuting the molded material and charring the binding material therein, activating, cooling, and then reheating.

16. In a process of making built-up structural adsorbent charcoal, heating a mixture of carbon with a non-fluid binder which chars on heating to the softening point of the binder, molding the mixture under substantial pressure, comminuting the molded material and charring the binding material therein and activating by heating and treatment with a mild oxidizing agent.

17. In a process of making built-up structural adsorbent charcoal, moistening or wetting a mixture of carbon and a non-fluid binder which chars on heating with a liquid which will dissolve, disperse or flux with the binder, molding the mixture under substantial pressure, comminuting the molded material and charring the binding material therein and activating by heating and treatment with a mild oxidizing agent.

18. In a process of making built-up structural adsorbent charcoal, heating a mixture of carbon with coal tar pitch to the softening point of said pitch, molding the mixture under substantial pressure, charring the binding material therein and activating by heating.

19. In a process of making built-up structural adsorbent charcoal, moistening or wetting a mixture of carbon and coal tar pitch with a liquid which will dissolve, disperse or flux with the pitch, molding the mixture under substantial pressure, charring the binding material therein and activating by heating.

20. In a process of making built-up structural adsorbent charcoal, moistening or wetting a mixture of carbon and coal tar pitch with a liquid which will dissolve, disperse or flux with the pitch, removing the excess liquid, molding the mixture under substantial pressure, charring the binding material therein and then activating by heating.

21. In a process of making built-up structural adsorbent charcoal, moistening or wetting a mixture of carbon and coal tar pitch with a volatile organic liquid which will dissolve, disperse or flux with the pitch, molding the mixture under substantial pressure, comminuting the molded material and charring the binding material therein and activating by heating and treatment with a mild oxidizing agent.

JACQUE C. MORRELL.